United States Patent
Li et al.

(10) Patent No.: US 12,184,417 B2
(45) Date of Patent: Dec. 31, 2024

(54) EARLY RETRANSMISSION FOR HARDWARE RELIABLE TRANSPORT

(71) Applicant: Google LLC, Mountain View, CA (US)

(72) Inventors: Yuliang Li, Sunnyvale, CA (US); Hassan Mohamed Gamal Hassan Wassel, San Jose, CA (US); Behnam Montazeri, San Jose, CA (US); Weihuang Wang, Los Gatos, CA (US); Srinivas Vaduvatha, San Jose, CA (US); Nandita Dukkipati, Palo Alto, CA (US); Prashant R. Chandra, San Jose, CA (US); Masoud Moshref Javadi, San Jose, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 17/879,853

(22) Filed: Aug. 3, 2022

(65) Prior Publication Data
US 2024/0048277 A1 Feb. 8, 2024

(51) Int. Cl.
*H04L 1/1607* (2023.01)
*H04L 1/1867* (2023.01)
*H04L 43/106* (2022.01)

(52) U.S. Cl.
CPC .......... *H04L 1/1671* (2013.01); *H04L 1/189* (2013.01); *H04L 43/106* (2013.01)

(58) Field of Classification Search
CPC ..... H04L 1/1671; H04L 1/189; H04L 43/106; H04L 1/1678; H04L 1/1614
USPC ....................................................... 714/748
See application file for complete search history.

(56) References Cited

U.S. PATENT DOCUMENTS

| | | | |
|---|---|---|---|
| 6,928,473 B1 * | 8/2005 | Sundaram | H04L 43/087 709/224 |
| 8,595,455 B2 | 11/2013 | Chatterjee et al. | |
| 8,861,432 B2 * | 10/2014 | Lim | H04W 48/16 370/328 |

(Continued)

FOREIGN PATENT DOCUMENTS

| | | |
|---|---|---|
| CN | 101174927 A | 5/2008 |
| CN | 110447191 A | 11/2019 |

(Continued)

OTHER PUBLICATIONS

Guo, et al. RDMA over Commodity Ethernet at Scale. 2016 Copyright held by the owner/author(s). Publication rights licensed to ACM. ISBN 978-1-4503-4193-6/16/08 . . . DOI: http://dx.doi.org/10.1145/2934872.2934908. 14 pages.

(Continued)

*Primary Examiner* — James C Kerveros
(74) *Attorney, Agent, or Firm* — Lerner David LLP (57) ABSTRACT

The technology is directed to the use of a bitmap generated at a receiver to track the status of received packets sent by a transmitter. The technology may include a network device including an input port, output port, and circuitry. The circuitry may generate a transmitter bitmap that tracks each data packet sent to another network device. The circuitry of the network device may receive, from the other network device, a receiver bitmap that identifies each data packet that is received and not received from the network device. The circuitry may then determine which data packets to retransmit by comparing the transmitter bitmap to the receiver bitmap.

16 Claims, 7 Drawing Sheets

(56) References Cited

U.S. PATENT DOCUMENTS

| | | | |
|---|---|---|---|
| 9,280,780 | B2 | 3/2016 | Turner et al. |
| 10,334,059 | B2 | 6/2019 | Lida et al. |
| 2003/0120802 | A1* | 6/2003 | Kohno ................ H04L 65/1101 709/237 |
| 2008/0181259 | A1* | 7/2008 | Andreev ................ H04L 65/80 370/519 |
| 2009/0116416 | A1* | 5/2009 | Sekiya ................ H04W 28/18 370/310 |
| 2011/0228714 | A1* | 9/2011 | Akbari ................ H04L 1/188 370/310 |
| 2016/0269294 | A1 | 9/2016 | Rankin |
| 2018/0123959 | A1* | 5/2018 | Maslak ................ H04L 47/125 |
| 2018/0278379 | A1* | 9/2018 | Sun ................ H04W 72/23 |
| 2019/0007170 | A1* | 1/2019 | Sun ................ H04L 1/0072 |
| 2019/0042336 | A1* | 2/2019 | McElrath ............... G06F 9/4887 |
| 2020/0021532 | A1* | 1/2020 | Borikar ................ H04L 47/28 |
| 2021/0126741 | A1* | 4/2021 | Cao ................ H04L 1/188 |
| 2021/0297897 | A1* | 9/2021 | Cunningham ........ H04L 1/1825 |

FOREIGN PATENT DOCUMENTS

| | | |
|---|---|---|
| CN | 113965254 A | 1/2022 |
| EP | 1105989 A2 | 6/2001 |
| JP | 2009055114 A | 3/2009 |

OTHER PUBLICATIONS

Cheng, et al. The Rack-TLP Loss Detection Algorithm for TCP. Stream: Internet Engineering Task Force (IETF). RFC: 8985. Category: Standards Track. Published: Feb. 2021. ISSN: 2070-1721. 29 pages.

Mittal, et al. Revisiting Network Support for RDMA. ACM, New York, NY, USA, 14 pages. Aug. 7, 2018.

Extended European Search Report for European Patent Application No. 23156845.2 dated Dec. 13, 2023. 9 pages.

Office Action for Chinese Patent Application No. 202310083980.5 dated Jul. 25, 2024. 9 pages.

Zhihu. TCP Series 23—Retransmission—13, RACK Retransmission. weixin_30689307. Nov. 7, 2016. 7 pages. (A machine-generated translation is attached).

* cited by examiner

| Transmitted Data Packets 500 | | | | | | | | | | |
|---|---|---|---|---|---|---|---|---|---|---|
| Packets 501 | p10 | p9 | p8 | p7 | p6 | p5 | p4 | p3 | p2 | p1 |
| Time Stamps 502 | t10 | t9 | t8 | t7 | t6 | t5 | t4 | t3 | t2 | t1 |
| Data 503 | d10 | d9 | d8 | d7 | d6 | d5 | d4 | d3 | d2 | d1 |

EARLY RETRANSMISSION FOR HARDWARE RELIABLE TRANSPORT

BACKGROUND

Data is typically split into smaller data units, referred to as packets, before being transmitted across a network. A source may transmit each data packet to a destination. The data may be reconstructed from the packets once the destination receives all the packets. The Internet protocol suite is a set of communication protocols used for servicing data transmissions between two devices communicating information over the Internet or other computer networks. Transmission Control Protocol ("TCP") is a part of the Internet protocol suite that provides for connection-oriented, reliable, and ordered delivery of a stream of data packets between, for example, a web-browser application running on a client device and a web-server application running on a server device over a local or wide area network. During the transmission of packets, issues such as congestion, network disconnects, malfunctioning nodes, etc., may result in packets being dropped and not received by the destination. Data packet losses may be remedied by the retransmission of the lost packets by the source.

BRIEF SUMMARY

Aspects of this disclosure provide a mechanism for improved packet loss detection and recovery. One aspect of the disclosure is directed to a network device. The network device may comprise an input port, an output port, and circuitry coupled to the input port and the output port. The circuitry may be configured to generate a transmitter bitmap comprising a first plurality of data bits, each data bit providing an indication that a given one of a plurality of data packets is transmitted to a second network device. The circuitry may also be configured to receive, from the second network device, a receiver bitmap comprising a second plurality of data bits, each data bit providing an indication that a given one of the first plurality of data packets is received or not received. The circuitry may be further configured to compare the bits of the transmitter bitmap to the bits of the receiver bitmap to identify one or more of the first plurality of data packets was not received.

In some examples, the circuitry is further configured to retransmit the one or more of the first plurality of data packets that were not received.

In some examples, identifying the one or more of the first plurality of data packets was not received includes determining a most recent data packet of the plurality of data packets transmitted by the network device and received by the second network device and determining the one or more data packets includes each data packet of the plurality of data packets transmitted before the most recent data packet that was not received.

In some examples, the circuitry is further configured to retransmit the one or more data packets.

In some examples, the circuitry is further configured to retransmit data packets of the one or more data packets that were transmitted a threshold number of data packets before the most recent transmitted data packet.

In some examples, the circuitry is further configured to receive, from the input port, an acknowledgment message communicated over the network from the second network device, the acknowledgment message including a timestamp value that provides an indication of when a given data packet of the plurality of data packets was sent by the network device, compare the timestamp value to one or more local timestamp values associated with one or more data packets previously sent by the network device to the second network device but not acknowledged as received by the second network device; and retransmit the one or more data packets for which the comparison indicates has a local timestamp value that is earlier in time than the timestamp value.

In some examples, the timestamp value is associated with a rack_xmit_ts parameter embedded in a header of the given data packet.

In some examples, the second network device returns the rack_xmit_ts parameter as the timestamp value.

In some examples, the timestamp value comprises an indication of a latest rack_xmit_ts parameter sent by the network device and received at the second network device.

In some examples, the one or more local timestamp values comprise one or more local rack_xmit_ts parameters embedded in headers of the one or data packets previously sent by the network device.

In some examples, the circuitry is further configured to determine an unreceived packet of the one or more data packets that was sent earliest in time, and transmit, to the second network device, the unreceived data packet sent earliest in time if no additional data packets are acknowledged as received by the second network device within a predetermined time.

In some examples, the acknowledgment packet comprises a plurality of data bits that provide an indication of whether data packets sent by the network interface card were received at the remote unit.

In some examples, the network device is a switch, router, or network interface card.

In some examples, the second network device is a switch, router, or network interface card.

In some examples, the circuitry includes a memory controller comprising memory and one or more processors.

In some examples, the memory stores the transmitter bitmap.

In some examples, the output port is communicatively coupled via a network to the second network device.

Another aspect of the disclosure is directed to a network interface card, comprising an input port communicatively coupled to a network, an output port communicatively coupled to the network, and circuitry coupled to the input port and the output port. The circuitry may be configured to transmit a plurality of data packets to a network device, receive, from the input port, an acknowledgment message communicated over the network from the network device, the acknowledgment message comprising a timestamp value that provides an indication of when a given data packet of the plurality of data packets was sent by the network interface card, compare the timestamp value to one or more local timestamp values associated with one or more data packets previously sent by the network interface card to the network device but not acknowledged as received by the network device, and retransmit the one or more data packets for which the comparison indicates has a local timestamp value that is earlier in time than the timestamp value.

In some examples, the circuitry is further configured to generate a transmitter bitmap comprising a first plurality of data bits, each data bit providing an indication that a given one of a plurality of data packets is transmitted to a network device; receive, from the network device, a receiver bitmap comprising a second plurality of data bits, each data bit providing an indication that a given one of the first plurality of data packets is received or not received; and compare the bits of the transmitter bitmap to the bits of the receiver bitmap to identify one or more of the first plurality of data packets was not received.

In some examples, at least one bit of the second plurality of data bits in the receiver bitmap is set to a value of 0, indicating the given one of the plurality of data packets was not received.

In some examples, at least one bit of the second plurality of data bits in the receiver bitmap is set to a value of 1, indicating the given one of the plurality of data packets was received.

DETAILED DESCRIPTION

The disclosed technology is directed to improving packet loss detection and recovery by proactively retransmitting data packets. An aspect of the technology covers an extended acknowledgment (EACK) schema, which involves the use of a bitmap at a receiver to track the status of received packets sent by a transmitter. EACK extends the conventional ACK bitmap by incorporating a bitmap at the receiver. This receiver bitmap indicates the packets that are and are not received by the receiver. For example, each bit in the bitmap may be given a value of "1" to indicate that a corresponding packet is received and a value of "0" to indicate that a corresponding packet has not been received. A receiver may then send the bitmap to the transmitter, also referred to herein as a sender, for further processing. The transmitter, after receipt of the bitmap, may determine from the individual values in the bitmap which packets were acknowledged as received and those that weren't. The transmitter may retransmit the packets which were not acknowledged in the bitmap.

Figure 1:
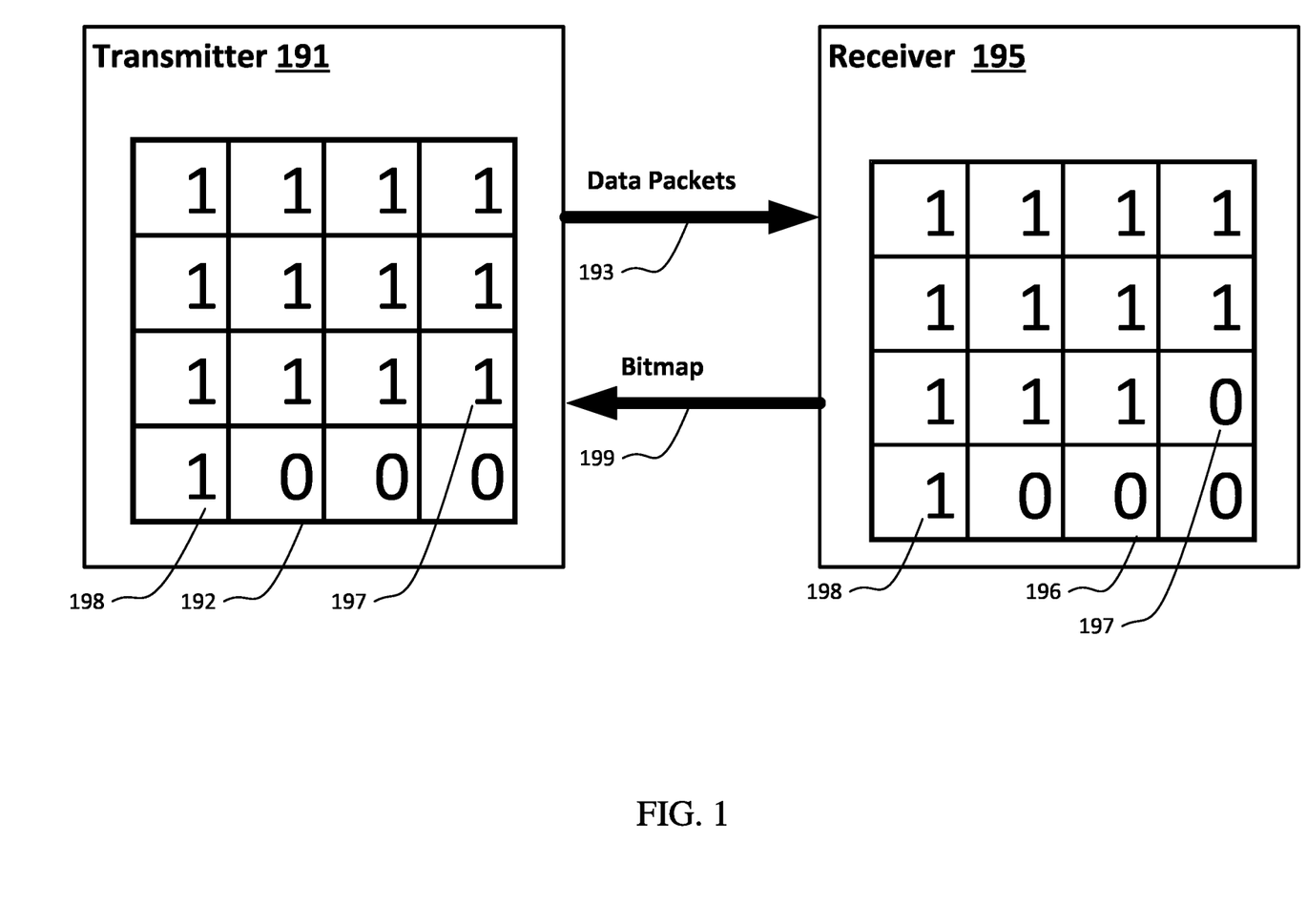
FIG. 1 is a block diagram illustrating communication between a receiver and transmitter in accordance with aspects of the disclosure.

For example, and as illustrated in FIG. 1, transmitter 191 transmits data packets 193 from a buffer to a receiver 195. Each data packet may be associated with a corresponding bit in a bitmap. The transmitter 191 maintains a sender bitmap 192 (also referred to herein as a "transmitter bitmap") that tracks all transmitted data packets. For example, upon transmitting a data packet associated with bit 198, the transmitter 191 may update bit 198 with a value of "1" to indicate that a corresponding data packet was transmitted.

The receiver may update the associated bits in the receiver bitmap 196 to indicate that the data packets were received. The receiver 195 may store the received data packets in a buffer. For instance, upon receiving the data packet associated with bit 198, the receiver 195 may update bit 198 with a value of "1" to indicate that a corresponding packet was received. The receiver 195 may then send the receiver bitmap 196 to the transmitter 191, as illustrated by arrow 199, for further processing.

The transmitter may compare the bits of the sender bitmap 192 to the received receiver bitmap 196 to determine from the individual values in the bitmap bits which packets were acknowledged as received and those that weren't. The transmitter may retransmit the packets which were not acknowledged in the bitmap. For instance, based on a comparison between receiver bitmap 196 and sender bitmap 192, the transmitter 191 may determine bit 197 was transmitted but not acknowledged. As such, the transmitter may retransmit bit 197 to receiver 195.

Figure 2:
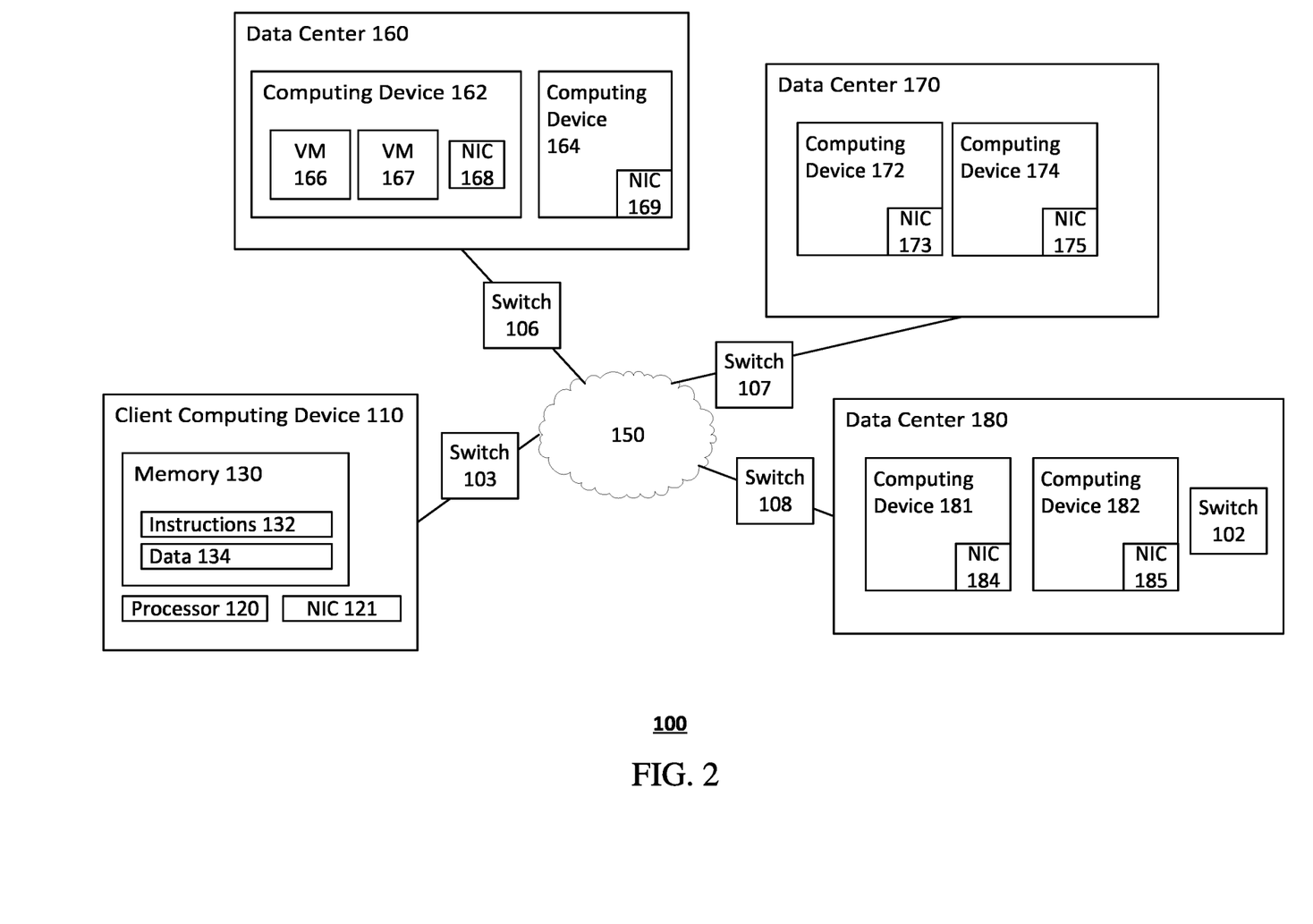
FIG. 2 is a functional diagram of an example system in accordance with aspects of the disclosure.

FIG. 2 illustrates an example system 100 including a distributed computing system. A plurality of data centers 160, 170, 180 may be communicatively coupled, for example, over a network 150 via switches 106, 107, and 108, respectively. The data centers 160, 170, 180 may further communicate with one or more client devices, such as client computing device 110 which is connected to the network 150 via network interface card (NIC) 121 and switch 103. Thus, for example, the client computing device 110 may execute operations in "the cloud."

Each client computing device 110 may be a personal computer intended for use by a person having all the internal components normally found in a personal computer, such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, NIC, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers, including general-purpose computers, PDAs, tablets, mobile phones, smartwatches, network computers lacking local storage capability, set-top boxes for televisions, and other networked devices.

The memory 130 can store information accessible by the processor 120, including instructions 132 that can be executed by the processor 120. Memory 130 can also include data 134 that can be retrieved, manipulated, or stored by the processor 120. The memory 130 may be a type of non-transitory computer-readable medium capable of storing information accessible by the processor 120, such as a hard-drive, solid state drive, flash drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an application-specific integrated circuit (ASIC), field programmable gate array (FPGA), etc. Additionally, the processor 120 may include multiple processors, multi-core processors, or a combination thereof.

The instructions 132 can be a set of instructions executed directly, such as machine code, or indirectly, such as scripts, by the processor 120. In this regard, the terms "instructions," "steps," and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored, or modified by the processor 120 in accordance with instructions 132. For instance, although a particular data structure does not limit the system and method, the data 134 can be stored in computer registers, in a distributed storage system as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 2 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM or external storage system, and others within a read-only computer chip. Some or all of the instructions and data can be stored in a location physically remote from, yet still accessible by, the processor 120. Similarly, the processor 120 can actually include a collection of processors, which may or may not operate in parallel.

The data centers 160, 170, 180 may be positioned a considerable distance from one another. For example, the data centers may be set in various countries around the world. Each data center 160, 170, 180 may include one or more computing devices, such as processors, servers, shards, or the like. The computing devices of the data centers may include some or all of the hardware described in relation to client computing device 110.

As shown in FIG. 2, data center 160 includes computing devices 162 and 164, data center 170 includes host computing devices 172 and 174, and data center 180 includes computing devices 181 and 182. According to some examples, the computing devices may be host computing devices executing one or more virtual machines. For example, computing device 162 is illustrated as a host computing device executing a plurality of virtual machines (VMs), including VMs 166 and 167, with each VM running an operating system and applications. While only a few virtual machines 166, 167 are illustrated in FIG. 2, it should be understood that any number of virtual machines may be supported by any number of computing devices. Moreover, it should be understood that the configuration illustrated in FIG. 2 is merely an example, and that the computing devices in each of the example data centers 160, 170, 180 may have various structures and components that may be the same or different from one another.

Programs may be executed across these computing devices. For example, some operations may be executed by one or more computing devices of a first data center while other operations are performed by one or more computing devices of a second data center. In some examples, the computing devices in the various data centers may have different capacities. For example, the different computing devices may have different processing speeds, workload capabilities, etc. While only a few of these computing devices are shown in FIG. 2, it should be understood that each data center 160, 170, 180 may include any number of computing devices, and that the number of computing devices in a first data center may differ from a number of computing devices in a second data center. Moreover, it should be understood that the number of computing devices in each data center 160, 170, 180 may vary over time, for example, as hardware is removed, replaced, upgraded, or expanded. Additionally, although FIG. 2 illustrates only a single client computing device 110 and three data centers 160, the system 100 may include any number of computing devices, including client computing devices, and/or data centers.

In some examples, each data center 160, 170, 180 may also include a number of storage devices (not shown), such as hard drives, flash drives, flash memory, random access memory, disks, disk arrays, tape drives, or any other types of storage devices. The data centers 160, 170, 180 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. The data centers may include a number of other devices in addition to the storage devices, such as cabling, routers, etc. Further, in some examples, the data centers 160, 170, 180 may be virtualized environments. Further, while only a few data centers 160, 170, 180 are shown, more data centers may be coupled over the network 150 and/or additional networks.

Client computing device 110 and data centers 160, 170, 180 may be capable of direct and indirect communication such as over network 150 via one or more network interface cards (NICs) and/or switches. The network 150, and intervening nodes, including switches 103, 106, 107, and/or 108, may include various configurations and protocols, including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing.

Such direct or indirect communication may be facilitated by a device capable of transmitting data to and from other computers or devices, such as a wired or wireless NIC. For example, and as illustrated in FIG. 2, client computing device 110 includes NIC 121, computing devices 162 and 164 of data center 160 include NICs 168 and 169, respectively, computing devices 172 and 174 of data center 170 include NICs 173 and 175, respectively, and computing devices 181 and 182 of data center 180 include NICs 184 and 185, respectively. These NICs may be configured to transmit and/or receive data packets over the network 150. The NICs may be memory-based NICs capable of handling various retransmission protocols, such as those described herein.

Data packets may be directed internally through data centers and through the network via one or more switches. As illustrated in FIG. 2, switch 103 connects client computing device 110 to network 150, and switches 106, 107, and 108 connect data centers 160, 170, and 180, respectively, to network 150. Although FIG. 2 illustrates a single switch connecting each of client computing device 110 and data centers 160, 170, 180 to the network 150, any number of switches may connect the computing devices and data centers to the network. Moreover, the network may include any number of switches, routers, and other devices capable of directing data packets and/or handling various retransmission protocols, such as those described herein.

Moreover, switches may be included within each data center for connecting computing devices, including processors, servers, shards, etc., together. For instance, computing devices 181 and 182 in data center 180 may be connected together and/or to the network 150 via NICs 184, 185, and switch 102. The switches may be memory-based switches capable of handling various retransmission protocols, such as those described herein.

Figure 3:
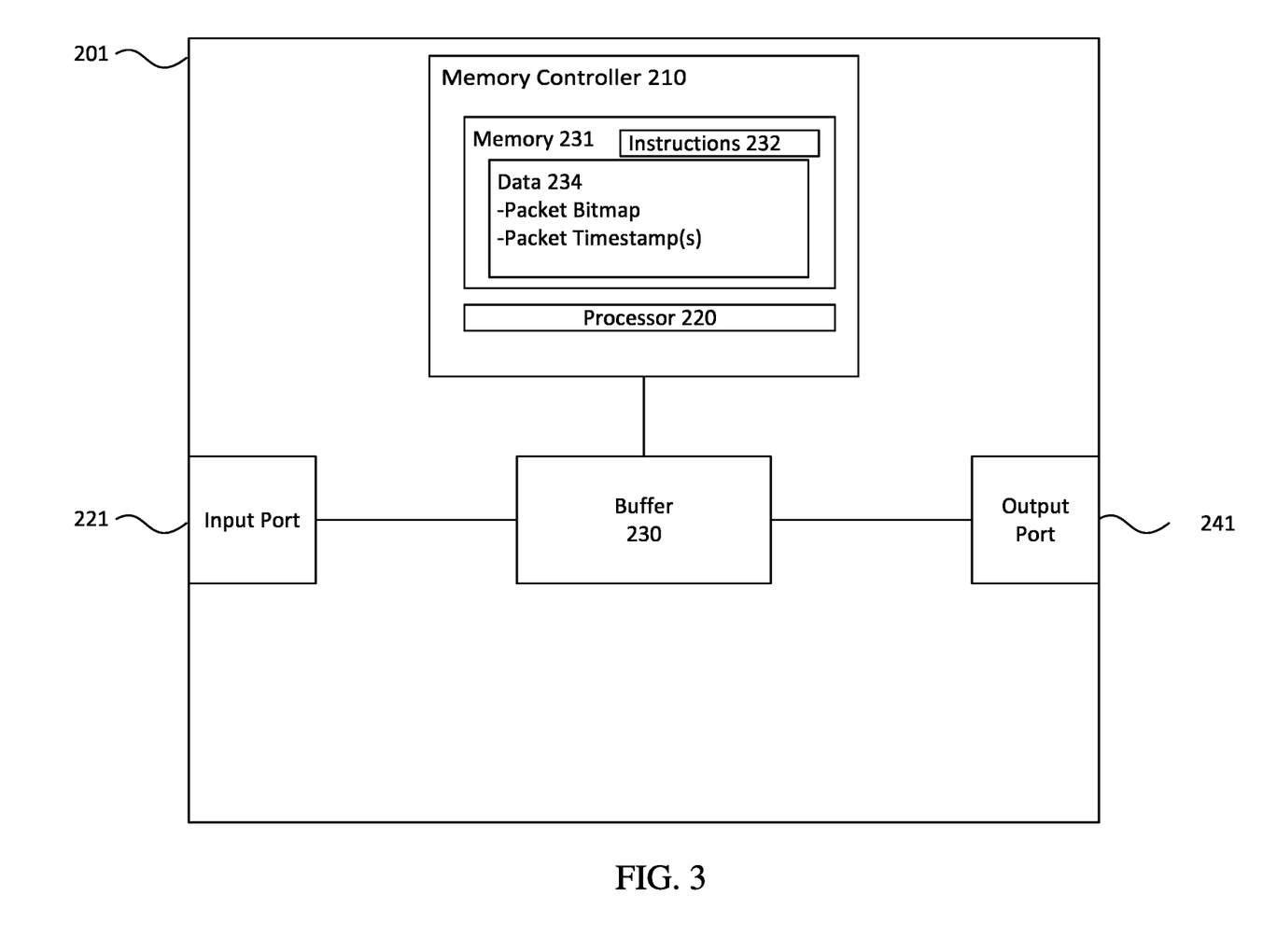
FIG. 3 illustrates an example network interface card in accordance with aspects of the disclosure.

FIG. 3 illustrates an example network interface card 201, which may be compared with the network interface cards in FIG. 2, such as NICs 121, 168, 169, 173, 175, 184, and 185. NIC 201 includes input port 221, output port 241, buffer 230, and memory controller 210. Although buffer 230 and memory controller 210 are shown as being separate components, the buffer and memory controller may be implemented on the same die or a separate dies. The input port 221 may receive data packets from one or more sources, such as another NIC, switch, router, or other such network devices capable of transmitting packets. The output port 241 may transmit data packets to one or more destinations, which may include other network devices capable of receiving packets. In this regard, a NIC may operate as both a transmitter and a receiver. Although not shown, the input port 221 and output port 241 may include logic for receiving and sending packets in accordance with instructions received from the memory controller 210. Moreover, NICs may include more than one input and/or output port.

The buffer 230 may be generally structured as an array of cells configured to hold data packets received from another network device and/or a computing device. In this regard, the cells operate as packet buffers from which the data packets in the buffer can be passed to another network device and/or a computing device. For instance, NIC 201 may be attached to a client computing device, such as client computing device 110. Accordingly, the NIC 201 may pass the data packets received from transmitters and stored in the buffer 230 to other components of the client computing device 110, such as processor 110 or memory 130. In another example, NIC 201 may be attached to another NIC. Accordingly, the NIC 201 may pass the data packets received from transmitters and stored in the buffer 230 to other NICs.

The buffer 230 may be constructed from integrated memory within the NIC 201 including any of DRAM, SRAM, etc., stacked memory including memory on one or more separate dies which are stacked onto the memory controller, co-packaged memory including one or more separate dies connected to the memory controller 210 through an interposer or substrate, known as high-bandwidth memory, and/or off-chip memory—such as a DRAM module.

The memory controller 210 may include a processor 220 and memory 231 storing instructions 232 and data 234. The processor may be similar to processor 120 and memory 231 may be similar to memory 130. The instructions 232 may be implemented by the memory controller 210 to execute algorithms that leverage the EACK schema described herein for receiving and transmitting data, such as data 234, which may include packet timestamps and packet bitmaps as further described herein. In some instances, the timestamps and/or packet bitmaps may be stored in buffer 230 or other memory of the NIC 201. Although FIG. 3 illustrates a NIC, some or all of the componentry and their respective functionalities described herein may be included in other network devices, such as switches, routers, etc.

Figure 4:
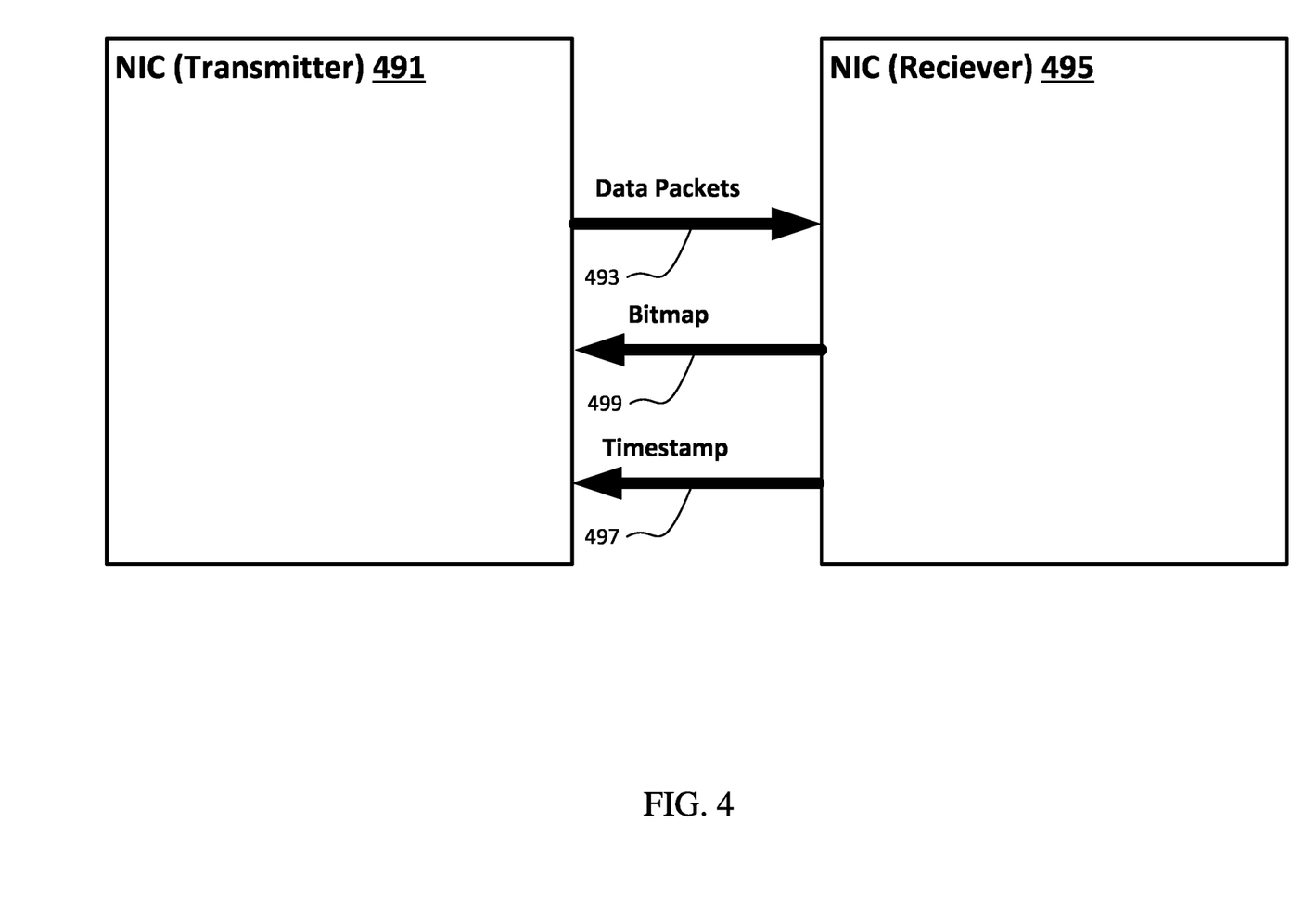
FIG. 4 is a block diagram illustrating communication between a receiver and transmitter in accordance with aspects of the disclosure

FIG. 4 illustrates a first NIC 491 operating as a transmitter, and a second NIC 495 operating as a receiver, in accordance with the EACK schema. As illustrated by arrow 493 in FIG. 4, the transmitter 491 transmits a set of data packets to the receiver 495.

Figure 5:
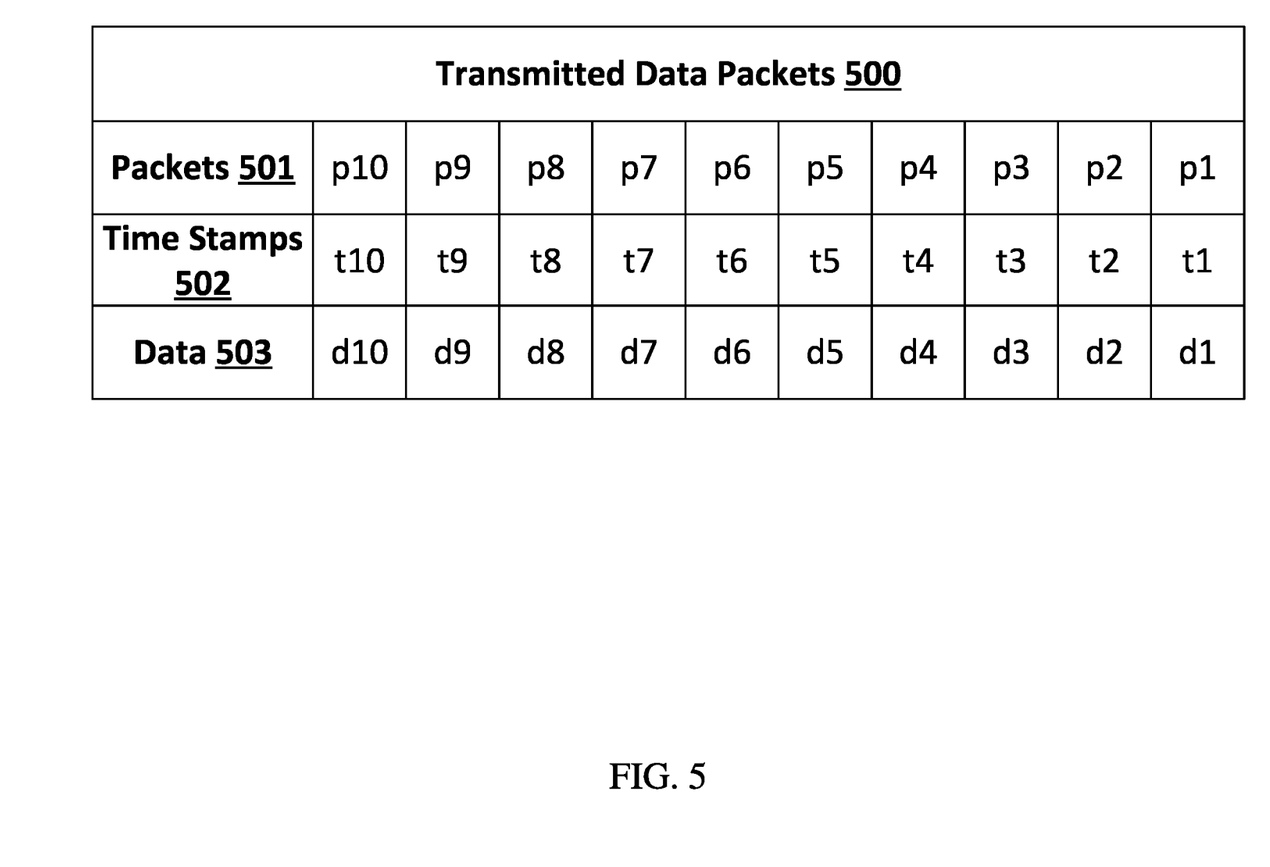
FIG. 5 is a table illustrating the contents of a set of data packets in accordance with aspects of the disclosure.

FIG. 5 shows a table 500 containing an example set of data packets 501, including data packets p1-p10 sent from the transmitter 491 to the receiver 495. Although FIG. 5 shows the set of data packets 501 as including 10 data packets p1-p10, a set of data packets can include any number of data packets.

As shown in FIG. 5, each data packet p1-p10 is associated and transmitted with a timestamp 502 corresponding to the time the data packet was transmitted by the transmitter 491 to the receiver 459. For instance, data packet p1 is associated with timestamp t1 and data packet p9 is associated with timestamp t9. The respective timestamps may be embedded in the header of each transmitted packet (e.g., by a sender or transmitter NIC). In some instances, the timestamp may be considered a "rack_xmit_ts" parameter embedded into the packet header. As discussed further herein, a timestamp, such as the rack_xmit_ts parameter, is reflected back by the receiver 495 to the transmitter 491 as part of an ACK/EACK message.

Each data packet in the set of data packets 501 may also include data 503. As shown in FIG. 5, data packets p1-p10 include data d1-d10, respectively. The data included in each data packet may be any type of data. Further, the data, d1-d10, may be complete pieces of data and/or portions of larger pieces of data.

Figure 6:
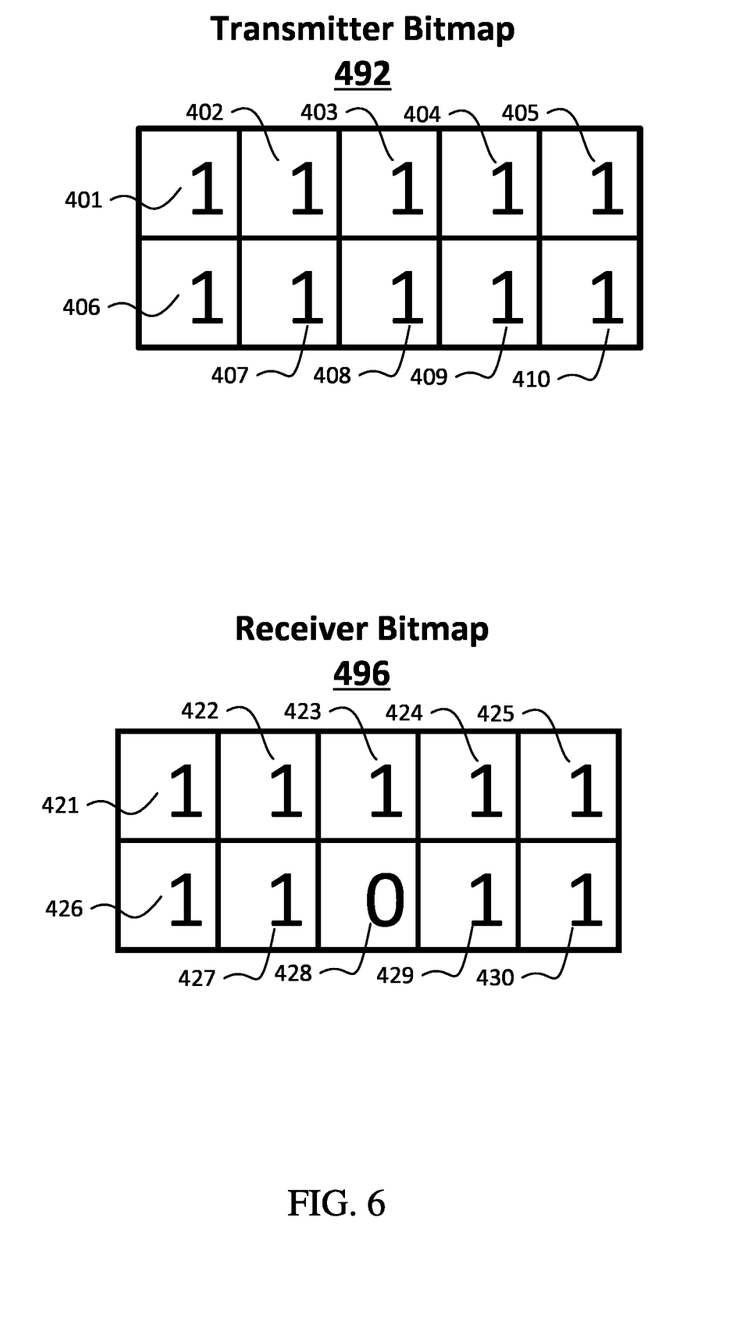
FIG. 6 illustrates example receiver and transmitter bitmaps in accordance with aspects of the disclosure.

As the transmitter 491 transmits the data packets to the receiver 495, the transmitter 491 may generate a transmitter bitmap to track the data packets that are sent. For instance, and as illustrated in FIG. 6, the transmitter 491 may generate (or update) a transmitter bitmap 492 to track the data packets p1-p10 sent to receiver 495. In this regard, transmitter bitmap 492 includes a 2×5 matrix including 10 bits, with bits 401-405 being in the top row and bits 406-410 being in the bottom row. Although not shown, the bitmap, or other storage location may track the timestamp associated with each transmitted data packet.

In operation, each data packet transmitted by the transmitter may be assigned to a bit in the transmitter bitmap. For example, transmitter 491 may assign each data packet p1-p10 a bit, such as bits 401-410, respectively. Upon transmitting each of these data packets from the buffer of the transmitter 491, the receiver 495 may update the assigned bit of the transmitter bitmap with a value, such as "1" to indicate that a corresponding data packet was received and stored in the buffer of the receiver 495. For instance, upon transmitting data packet p1, the transmitter 491 may update bit 401 from a value of "0" to "1". Although "0" and "1" are used in the examples herein, the values to indicate sent and unsent bits may be any values.

The receiver may update bits in the receiver bitmap 496 to indicate that the data packets were received, upon receiving data packets, as further shown in FIG. 6. For instance, upon receiving the data packets p1-p7 and p9-p10, the receiver 195 may update bits 421-427 and 429-430, respectively, with a value of "1" to indicate that corresponding data packets were received. In the example receiver bitmap 496, bit 428 has not been received, indicating that p8 was not received.

Although transmitter bitmap 492 and receiver bitmap 496 are shown as 2×5 (row/column) matrices, a bitmap may be any size, such as 128×128, 128×64, 256×128, etc. Moreover, the size of transmitter and receiver bitmaps do not need to be the same size as a set of data packets. In this regard, a transmitter and receiver bitmaps may track portions of a set of data packets or multiple sets of different data packets.

The receiver may have a fixed size bitmap which may limit the amount of bits the bitmap may store. In this regard, the receiver may shift the bitmap as the lowest sequence number is received. For example, a receiver, such as receiver 195 may receive packets in a sequence, such as sequence numbers 0, 1, 2, 3, 4, and 5. Initially, the bitmap may represent packets 0, 1, 2, and then, after receiving 2, may shift, such that the bitmap represents 3, 4, 5, 6, 7, and 8. If a transmitter sends a packet outside the bitmap range, the receiver may use another bit (e.g., the OOW bit discussed further herein) in EACK to indicate to the transmitter that some packet outside the bitmap range is received.

The receiver 495 may periodically send the receiver bitmap 496 to the transmitter 491, as illustrated by arrow 499 as part of an EACK message. The transmitter 491 may compare the bits of the transmitter bitmap 492 to the received receiver bitmap 496 to determine from the individual values in the bitmap bits which data packets were acknowledged as received and those that were not. The comparison may be performed by a processor in the NIC, such as the processor within the memory controller of the NIC.

As illustrated in FIG. 6, receiver bitmap 496 indicates data packet p8 was not received, but transmitter bitmap 492 indicates that data packet p8 was sent. Accordingly, based on the comparison of the bitmaps, the transmitter 491 may determine packet p8 was transmitted but not acknowledged and therefore retransmit data packet p8.

A transmitter may implement an out-of-order (OOO) distance algorithm that leverages a receiver bitmap provided in an EACK message to disambiguate losses and reordering. For instance, if the receiver bitmap sent by the receiver to the sender indicates that a data packet was transmitted to the receiver a threshold number of data packets before the received data packet with the largest sequence number, the unreceived data packet may be identified as likely lost. Therefore, the unreceived data packet can be retransmitted at the next available opportunity or, if possible, immediately (e.g., on the order of one or multiple clock cycles).

Continuing the previous example, the transmitter 491 may determine that data packet p8 was not received by comparing the receiver bitmap 496 to the transmitter bitmap 492. Likewise, the transmitter may also determine that data packets p9 and p10 were received. If the threshold number for the OOO distance algorithm is two (2) packets, the transmitter 491 may retransmit data packet p8, as two data packets, p9 and p10, have been received by the receiver 495 thereby satisfying the threshold value. Similarly, if data packet p9 was not received but data packet p10 was received, data packet p8 would still be retransmitted, as data packet p10 is two data packets later in sequence than data packet p8. Data packet p9 would not be retransmitted until the transmitter determines data packet p11 or greater is received by the transmitter 491.

However, suppose the threshold value is three (3) data packets. In that case, the transmitter 491 may not retransmit data packet p8, since only two data packets, p9 and p10, have been transmitted by the transmitter 491 since data packet p8 was sent. Since two data packets are less than the threshold value of three data packets, the transmitter 491 would not retransmit data packet p8. The foregoing threshold values are examples. The threshold value of data packets may be predefined and/or adjustable based on network traffic. Further, the threshold value of data packets may be any number of data packets, including zero (0) data packets.

The transmitter may implement a recent acknowledgment (RACK) loss detection algorithm to reduce or remove uncertainty concerning whether packets were lost and/or received out of order. For example, if the receiver bitmap indicates that a packet is not received, but a packet sent sufficiently later in time is received, the unreceived packet may be processed as likely lost and therefore can be retransmitted at the next available opportunity or, if possible, immediately (e.g., on the order of one or multiple clock cycles).

As previously explained, a transmitter may embed a timestamp parameter into each data packet, such as a "rack_xmit_ts" parameter embedded in the header of each data packet. This timestamp may be reflected back by the receiver as part of an ACK/EACK message sent to the transmitter, as illustrated by arrow 497 in FIG. 4. The transmitter may then use the reflected back timestamp to check against the transmission timestamps of unreceived packets (i.e., packets that have not been acknowledged as received). Any packets with a timestamp earlier in time than the latest timestamp acknowledged as received are candidates to be retransmitted immediately or at a later time.

Because the rack_xmit_ts is set as the reflected transmitter timestamp, the transmitter does not need to scan all newly received packets. In particular, the transmitter may have a record of packets for which it did not yet receive an acknowledgment, as determined by a comparison between the receiver bitmap and transmitter bitmap. The transmitter may then compare the reflected transmitter timestamp for the unacknowledged data packets and retransmit those data packets with an earlier timestamp than the reflected timestamp. This allows a mechanism that is more hardware compatible, given that it is generally infeasible to scan all newly received packets in hardware as would be required by techniques that set rack_xmit_ts as the largest transmitter timestamp value detected among the packets that are acknowledged by each received ACK/EACK/NACK messages, as done in the TCP recent acknowledgment (RACK). That is, in past implementations of RACK, the receiver does not reflect the transmit timestamp of the latest received packet. As such, the transmitter is required to scan all newly acknowledged packets to find the largest transmit timestamp of them, and use it as rack_xmit_ts. In contrast, the RACK implementation disclosed herein relies on the reflected rack_xmit_ts of the latest received packet. As such, the transmitter is not required to search for the largest transmit timestamp.

As an example of the foregoing RACK loss detection algorithm, assume a transmitter, such as transmitter 491, transmits data packets 501 with timestamps 502 ($t1$, $t2$, $t3$, . . . $t6$, $t10$) to receiver 495. The receiver 495 may send one or more acknowledgment messages (e.g., ACK/EACK) that indicate receipt of data packets sent at timestamps $t1$, $t2$, and $t4$. Upon receipt of acknowledgment that the data packet associated with $t4$ was received, the transmitter will then realize that packet sent at timestamp $t3$ has not been acknowledged and is, therefore, likely lost. The transmitter may then retransmit the data packet previously sent at $t3$ with a new timestamp $t8$. Subsequently, the sender may receive acknowledgment of receipt of the data packet associated with timestamp $t7$, but no acknowledgment is received for the data packets sent at $t6$ and $t5$. The transmitter 491 may then retransmit the packets previously sent with timestamps $t5$ and $t6$ with timestamps $t9$ and $t10$.

In some instances, data packets may be resent if they were sent a predefined amount of time before the timestamp of the most recently received data packet. In this regard, a threshold time period may be defined. After receiving notification of the most recently received data packet, the transmitter 491 may determine if any data packets were transmitted earlier then [rack_xmit_ts−threshold time period] and not confirmed as received. For all data packets that were transmitted at a time longer than the threshold time period, the transmitter 491 may retransmit these data packets.

In some examples, if an unreceived data packet's timestamp is T0, and rack_xmit_ts−T0<the threshold time period, this unreceived data packet may not be retransmitted immediately. Rather, a timer may be set up to retransmit at [current time−rack_xmit_ts+threshold time period+T0].

In some instances, a transmitter, such as transmitter 491, may fail to receive acknowledgment messages (EACK) of received data packets from a receiver, such as receiver 495, for a certain amount of time. Additionally, the transmitter 491 may not have sent data packets for a predetermined amount of time. Such circumstances may be considered a probe timeout (PTO). In a PTO, the transmitter 491 may retransmit the unreceived data packet having the smallest sequence number as a probe packet to trigger the receiver 495 to send an ACK/EACK/NACK. As the probe packet is the unreceived packet having the smallest sequence number, it is not received as an out-of-order packet at the receiver 495. Accordingly, the buffer of the receiver does not need to buffer this packet as an out-of-order packet.

In contrast, a scheme that sends the last unreceived packet (e.g., TCP tail loss probe (TLP)) may result in the retransmitted packet being dropped (i.e., unreceived again) as it may be out-of-order This may be because of a lack of space in the NIC buffer. In this regard, the buffers within NICs are typically limited in size, and may be unable to store out-of-order packets. Thus, in TCP-TLP that retransmits the last unreceived packet, the retransmitted packet may be continually dropped.

Existing ACK coalescing engines may be extended for EACK. One extension may be the addition of a new OOO bit that triggers the coalescing engine timer and counter when an OOO event is detected. In addition, an ACK format decider may be implemented after the coalescing engine to determine whether to send an ACK or EACK message. For instance, if there are holes in the received receiver bitmap (i.e., there are unacknowledged packets with earlier in-time timestamps), the EACK message format may be used. On the other hand, if there are no holes in the received receiver bitmap or no packets have been received (i.e., bitmap=then a conventional ACK message may be sent.

In addition, an EACK message may be triggered when an out-of-window (OOW) packet is received. In this regard, the EACK may include an out-of-window (OOW) bit to indicate if there has been an OOW bit received that cannot be captured in the receiver bitmap. In this regard, an OOW packet may be implemented so as to directly trigger the generation and transmittal of an EACK message. This aspect of the inventive technology may be implemented in pseudocode as follows:
(1) if there are OOO packets received in the 128-bit receiver window, send an EACK with the received bitmap correctly reflecting the received state, and the OOW bit set
(2) if there are no other OOO packets received in the receiver window, send EACK with the received bitmap of all 0's, and the OOW bit set.

In some instances, the EACK schema may be backward compatible with preexisting systems. In this regard, a sender and receiver may negotiate whether ACK or EACK will be used. If either side does not support EACK, ACK may be used. In some instances, the receiver may send both EACK and ACK.

Although the foregoing examples describe communication between a single transmitter and receiver, each transmitter and receiver may communicate with any number of receivers and transmitters, respectively. A separate bitmap may be generated for each line of communication (i.e., for each transmitter/receiver pair). For instance, if a transmitter transmits data to two receivers, the transmitter may generate two bitmaps, with each bitmap tracking the data transmitted to a respective receiver.

Figure 7:
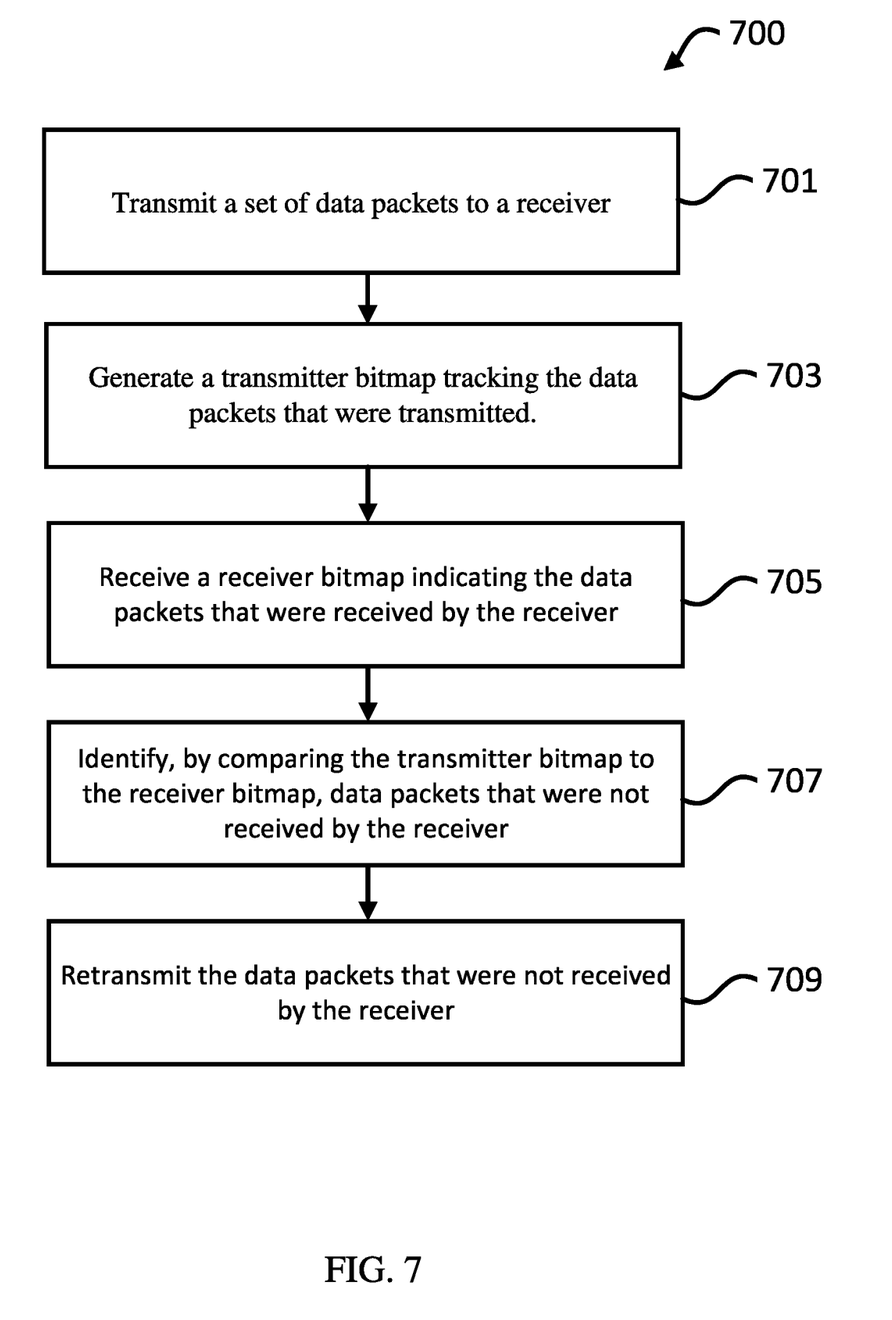
FIG. 7 is a flow diagram outlining the operation of a transmitter in accordance with aspects of the disclosure.

FIG. 7 is a flow chart 700 illustrating steps that may be implemented by a transmitter. As shown in block 701, the transmitter may transmit data packets to a receiver. The transmitter may generate a transmitter bitmap that tracks each data packet that is sent to the receiver, as shown in block 703. The transmitter may receive a receiver bitmap that indicates which data packets were received by the receiver, as shown in block 705. The transmitter may determine which transmitted data packets were not received by comparing the transmitter bitmap to the receiver bitmap, as shown in block 707. The transmitter may then retransmit the data packets that were not received, as shown in block 709.

Although the technology herein has been described with reference to particular embodiments, it is to be understood that these embodiments are merely illustrative of the principles and applications of the present technology. It is, therefore, to be understood that numerous modifications may be made to the illustrative embodiments and that other arrangements may be devised without departing from the spirit and scope of the present technology as defined by the appended claims. The operations described herein do not have to be performed in the precise order described. Rather, various steps can be handled in a different order or simultaneously, and steps may also be added or omitted.

Unless otherwise stated, the foregoing alternative systems, methods, and examples are not mutually exclusive but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A network device, comprising:
an input port;
an output port; and
circuitry coupled to the input port and the output port, the circuitry being configured to:
generate a transmitter bitmap comprising a first plurality of data bits, each data bit providing an indication that a given one of a plurality of data packets is transmitted to a second network device;
receive, from the second network device, a receiver bitmap comprising a second plurality of data bits, each data bit providing an indication that a given one of the plurality of data packets is received or not received; and
compare, at the network device, the bits of the transmitter bitmap to the bits of the receiver bitmap to identify one or more of the plurality of data packets that were transmitted to the second network device but were not received by the second network device,
wherein identifying the one or more of the plurality of data packets was not received includes:

determining a most recent data packet of the plurality
of data packets transmitted by the network device
and received by the second network device; and
determining the one or more data packets includes
each data packet of the plurality of data packets
transmitted before the most recent data packet that
was not received,
wherein the circuitry is further configured to retransmit
data packets of the one or more data packets that
were transmitted a threshold number of data packets
before the most recent transmitted data packet, and
wherein the threshold number of data packets is adjustable based on network traffic.

2. The network device of claim 1, wherein the circuitry is further configured to retransmit the one or more of the plurality of data packets that were transmitted to the second network device but were not received by the second network device.

3. A network device, comprising:
an input port;
an output port; and
circuitry coupled to the input port and the output port, the circuitry being configured to:
generate a transmitter bitmap comprising a first plurality of data bits, each data bit providing an indication that a given one of a plurality of data packets is transmitted to a second network device;
receive, from the second network device, a receiver bitmap comprising a second plurality of data bits, each data bit providing an indication that a given one of the plurality of data packets is received or not received; and
compare, at the network device, the bits of the transmitter bitmap to the bits of the receiver bitmap to identify one or more of the plurality of data packets that were transmitted to the second network device but were not received by the second network device,
wherein the circuitry is further configured to:
receive, from the input port, an acknowledgment message communicated over the network from the second network device, the acknowledgment message including a timestamp value that provides an indication of when a given data packet of the plurality of data packets was sent by the network device;
compare the timestamp value to one or more local timestamp values associated with one or more data packets previously sent by the network device to the second network device but not received by the second network device; and
retransmit the one or more data packets for which the comparison indicates has a local timestamp value that is earlier in time than the timestamp value, and
wherein the circuitry is further configured to:
determine an unreceived data packet of the one or more data packets that was sent earliest in time; and
transmit, to the second network device, the unreceived data packet sent earliest in time when the difference between the timestamp value for a most recently received packet and the local timestamp value for the unreceived packet sent earliest in time meets or exceeds a threshold.

4. The network device of claim 3, wherein the timestamp value is associated with a rack_xmit_ts parameter embedded in a header of the given data packet.

5. The network device of claim 4, wherein the second network device returns the rack_xmit_ts parameter as the timestamp value.

6. The network device of claim 5, wherein the timestamp value comprises an indication of a latest rack_xmit_ts parameter sent by the network device and received at the second network device.

7. The network device of claim 4, wherein the one or more local timestamp values comprise one or more local rack_xmit_ts parameters embedded in headers of the one or data packets previously sent by the network device.

8. The network device of claim 3, wherein the acknowledgment message comprises a plurality of data bits that provide an indication of whether data packets sent by the network device were received at the second network device.

9. The network device of claim 1, wherein the network device is a switch, router, or network interface card.

10. The second network device of claim 1, wherein the second network device is a switch, router, or network interface card.

11. The network device of claim 1, wherein the circuitry includes a memory controller comprising memory and one or more processors.

12. The network device of claim 11, wherein the memory stores the transmitter bitmap.

13. The network device of claim 1, wherein the output port is communicatively coupled via a network to the second network device.

14. A network interface card, comprising:
an input port communicatively coupled to a network;
an output port communicatively coupled to the network
circuitry coupled to the input port and the output port, the circuitry being configured to:
transmit a plurality of data packets to a network device;
receive, from the input port, an acknowledgment message communicated over the network from the network device, the acknowledgment message comprising a timestamp value that indicates the time that a given data packet of the plurality of data packets was transmitted by the network interface card;
compare the timestamp value to one or more local timestamp values associated with one or more data packets previously sent by the network interface card to the network device but for which the network device has not acknowledged receipt; and
retransmit the one or more data packets when the difference between the timestamp value and the local timestamp value for the one or more data packets meets or exceeds a threshold.

15. The network interface card of claim 14, wherein the circuitry is further configured to:
generate a transmitter bitmap comprising a first plurality of data bits, each data bit providing an indication that a given one of a plurality of data packets is transmitted to a network device;
receive, from the network device, a receiver bitmap comprising a second plurality of data bits, each data bit providing an indication that a given one of the plurality of data packets is received or not received; and
compare the bits of the transmitter bitmap to the bits of the receiver bitmap to identify one or more of the plurality of data packets that were transmitted to the network device but were not received by the network device.

16. The network interface card of claim 15, wherein at least one bit of the second plurality of data bits in the receiver bitmap is set to a value of 0, indicating the given one of the plurality of data packets that were transmitted to the network device but were not received by the network device, and wherein at least one bit of the second plurality of data bits in the receiver bitmap is set to a value of 1, indicating the given one of the plurality of data packets was received.

* * * * *